March 16, 1926.
T. W. SELSER
1,577,306
CALF WHEEL CONSTRUCTION
Filed Nov. 24, 1923
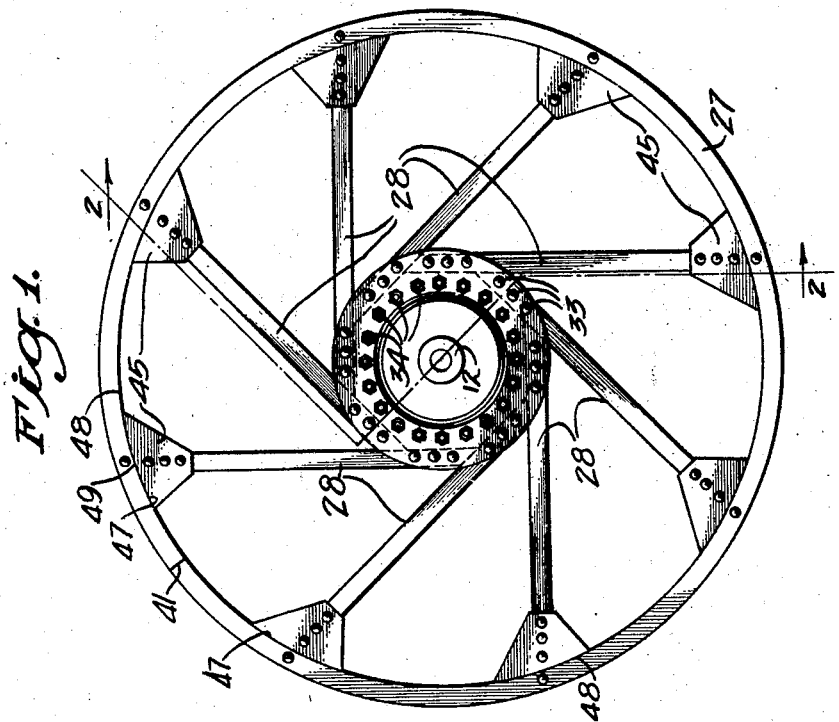
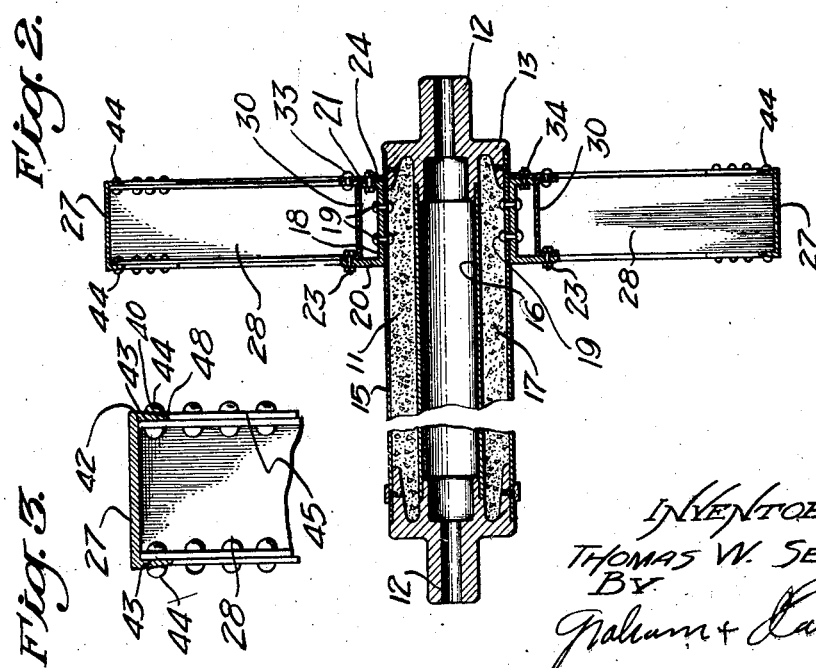
INVENTOR:
THOMAS W. SELSER,
BY
Graham + Lewis
ATTORNEYS Patented Mar. 16, 1926.

1,577,306

UNITED STATES PATENT OFFICE.

THOMAS W. SELSER, OF HUNTINGTON PARK, CALIFORNIA, ASSIGNOR, BY MESNE ASSIGNMENTS, TO EMSCO DERRICK & EQUIPMENT COMPANY, OF LOS ANGELES, CALIFORNIA, A CORPORATION OF CALIFORNIA.

CALF-WHEEL CONSTRUCTION.

Application filed November 24, 1923. Serial No. 676,365.

*To all whom it may concern:*

Be it known that I, THOMAS W. SELSER, a citizen of the United States, residing at Huntington Park, in the county of Los Angeles and State of California, have invented a new and useful Calf-Wheel Construction, of which the following is a specification.

This invention relates to equipment employed in the oil producing industries and relates particularly to the construction of calf wheels, and wheels of a similar character employed in the drilling rig of an oil drilling derrick.

It is an object of the invention to provide a metal calf wheel, preferably steel, which may be used in place of the common wooden wheels. By the use of metal construction, the life of the wheel is considerably extended and a wheel provided which is vastly superior to wooden wheels with respect to durability, balance and longevity.

It is an object of the invention to provide a calf wheel having a rim which may be conveniently formed from a channel member and which is demountable from the hub structure and may be readily assembled at the location where it is to be used.

The especial advantages of the invention and further objects thereof will be made evident hereinafter.

Referring to the drawing which is for illustrative purposes only:

Fig. 1 is an end elevation of a calf wheel incorporating the features of my invention.

Fig. 2 is a section taken on a plane represented by the line 2—2 of Fig. 1.

Fig. 3 is an enlarged fragmentary section through the band and showing the manner in which the band is joined to the spoke members.

As shown in the drawing, a hub member 11 of cylindrical form is provided which may be of extended length so as to provide a spool or drum upon which to wind rope or cable and which is provided with gudgeons 12 formed on casting members 13. Between these casting members, tubular shells 15 and 16 are extended, the outer member 15 being preferably a length of large diameter casing and the inner tubular member 16 consisting of a length of standard pipe. The space 17 between these members is filled with concrete or other cementitious material and a rigid structure is thereby obtained.

Near the leftward end of the member 11, a mounting member in the form of a casting 18 is secured by rivets 19 as shown, the member 18 constituting the hub portion of the calf wheel. The member 18 presents an inner annular flange 20 and an outer annular flange 21 which is of a diameter substantially smaller than that of the flange 20. Arranged concentrically around the hub member 18 is a band 27 from which channel spoke members 28 extend inwardly in such a position that the hub ends 30 thereof are disposed tangentially in respect to the periphery of the annular flange 20 and extend within the limits thereof so that they may be bolted to the flange 20 as indicated at 23 in Fig. 2. On the outer or leftward face of the hub ends 30 of the spokes 28, an annular conecting plate 24 is secured by rivets 33, the plate extending inwardly along the outer face of the flange 21 and may be bolted thereto by the bolts 34 as shown. The calf wheel may be considered as being comprised of two main parts; the hub section consisting of the casting member 18 mounted on the member 11; and the wheel section consisting of the rim 27, the spokes 28 and the plate 24. The hub and wheel section may be very easily dissembled by first removing the bolts 23 and 34 and then shifting the wheel section in a rightward direction. By providing separable parts as shown, the shipping thereof may be appreciably facilitated.

The band 27 is formed by rolling a structural channel into circular form with the flanges 40 thereof inwardly extended. When in circular form, the ends of the channel may be welded together at 41 so as to provide a continuous band. The outward faces of the flanges which are part of the spoke channels 28 are parallel in extension. The flanges 40 of the band 27 are bent inwardly as indicated at 42 in Fig. 3 to bring the inner faces 43 thereof into corresponding parallelism wherein they will fit snugly against the flanges of the spoke members 28 and may be secured thereto by the use of rivets 44. Gusset plates 45 of triangular form are riveted to the flanges of the spoke members and the outer edges thereof are welded as indicated at 48 to the inner edge 49 of the adjacent flange 40 of the band 27. In this manner, the band 27 is firmly secured to the spokes 28 and a construction of great durability thereby accomplished.

Especial attention is directed to the feature of demountability between the wheel portion and the combined hub and drum. The hub member 11 is of massive construction and the combined weight of this member and the wheel structure when assembled would make handling during shipment very difficult. By shipping the hub and wheel in dismounted condition, ease in handling during shipment and transportation throughout the fields is made possible.

I claim as my invention:

1. In a wheel of the character described, the combination of: a hub member; an annular structure on said hub member providing at one end of said annular structure a cylindrical shelf and a radially extending stop, and at the other end a second outwardly disposed cylindrical shelf; a wheel structure defining an opening of a size to fit over said second cylindrical shelf, one side of said wheel structure resting against the outer part of said first cylindrical shelf and radially extending stop; and an inwardly radially directed flange on the opposite side of said wheel structure arranged to rest against and be bolted to the side of said second cylindrical shelf.

2. In a wheel of the character described, the combination of: a hub member; a primary flange extending radially from said hub member; a secondary flange extending from said hub, said secondary flange being of smaller diameter than said primary flange; a wheel structure comprising a band and spoke members, the inner ends of said spoke members defining a central opening through which said secondary flange will pass; a circular connection plate secured to the inner ends of said spoke members, said plate being internally of smaller diameter than the outer edge of said secondary flange and being arranged to rest against the face of said secondary flange when said wheel structure is placed on said hub; and means for removably securing said plate to said secondary flange.

In testimony whereof, I have hereunto set my hand at Los Angeles, California, this 9th day of November, 1923.

THOMAS W. SELSER.